United States Patent [19]

Beck, Jr.

[11] Patent Number: 5,170,963
[45] Date of Patent: Dec. 15, 1992

[54] VTOL AIRCRAFT

[75] Inventor: August H. Beck, Jr., San Antonio, Tex.

[73] Assignee: August H. Beck Foundation Company, San Antonio, Tex.

[21] Appl. No.: 764,806

[22] Filed: Sep. 24, 1991

[51] Int. Cl.$^5$ .................................. B64C 29/02
[52] U.S. Cl. .......................... 244/12.2; 244/23 C; 244/73 C
[58] Field of Search .............. 244/12.2, 236, 23 C, 244/34 A, 73 C

[56] References Cited

U.S. PATENT DOCUMENTS

| | | | |
|---|---|---|---|
| 1,660,257 | 2/1928 | Crespo | 244/73 C |
| 2,927,746 | 3/1960 | Mellen | 244/12.2 |
| 2,944,762 | 7/1960 | Lane | 244/12.2 |
| 2,996,266 | 8/1961 | Rebasti | 244/12.2 |
| 2,997,254 | 8/1961 | Mulgrave et al. | 244/12.2 |
| 3,002,709 | 10/1961 | Cochran | 244/12.2 |
| 3,051,417 | 8/1962 | Frost et al. | 244/23 C |
| 3,124,323 | 3/1964 | Frost | 244/12.2 |
| 3,276,723 | 10/1966 | Miller et al. | 244/12.2 |
| 3,312,425 | 4/1967 | Lennon et al. | 244/12.2 |
| 3,785,592 | 1/1974 | Kerruish | 244/12.2 |
| 4,193,568 | 3/1980 | Heuvel | 244/23 C |
| 4,208,025 | 6/1980 | Jefferson | 244/23 C |

FOREIGN PATENT DOCUMENTS

| | | | |
|---|---|---|---|
| 1456032 | 12/1968 | Fed. Rep. of Germany | 244/23 C |
| 2540659 | 3/1977 | Fed. Rep. of Germany | 244/23 C |

Primary Examiner—Galen Barefoot
Assistant Examiner—Virna Lissi Ansley
Attorney, Agent, or Firm—Charles W. Hanor

[57] ABSTRACT

The present invention provides a vertical takeoff and landing aircraft vehicle in which a ducted fan with upwardly directed inlet discharges air generally horizontally across a segmented circular wing. Said wing segments are individually controllable in pitch and each includes a spoiler and split flaps to increase effectiveness and sensitivity in lifting and controlling the aircraft. Directional stability and thrust for horizontal movement is provided by controls directing different proportions of total airflow to the various segments around the aircraft and varying the direction of said airflow both radially and vertically. Power failure protection is provided by means for maintaining free rotation of the fan until needed to provide lift at touchdown.

13 Claims, 8 Drawing Sheets

VTOL AIRCRAFT

BACKGROUND OF THE INVENTION

1. Field of the Invention

The field of the present invention is general aviation and, more particularly, the class of aircraft capable of vertical takeoff and landing (VTOL). The present invention further belongs to that subclass of VTOL aircraft with generally radial symmetry, designed for relatively low speed flight at low altitudes, suitable for use as an airport-to-downtown shuttle, home-to-office commuter, etc.

2. Related Art

The most common and widely employed vertical takeoff and landing (VTOL) aircraft is the helicopter. The success of this vehicle is due to the urgent need for this VTOL capability rather than to any particular distinction inherent in the genus. A short list of undesirable characteristics of helicopters include: long rotating blades which are a hazard to personnel and to the aircraft itself should they strike anything in the area, requirement for a remotely mounted propeller to counteract torque reaction of the airframe to the drive of the main rotor, complicated and relatively fragile rotor blade attack-angle controls, high maintenance requirements and rotor blades which must be long, thin, and relatively light and thus are flexible and subject to fatigue problems. Add to this incomplete list the fact that failure of any one of these components is likely to have catastrophic consequences for the aircraft and all on board and it is evident that an alternative design is desirable.

Man first flew in hot air balloons which, of course, are VTOL. The quest for heavier-than-air vehicles with this capability is approximately as old as any segment of the aircraft industry, but has accelerated since the end of World War II, and especially after the Vietnam War following the major role of helicopters in the latter conflict. A number of patents in the field of generally radially symmetrical aircraft have been granted, but it is not known that any have become successful in the market.

This may be due to the fact that these designs, while including many worthwhile ideas, did not integrate enough of them in any single concept, along with proven aircraft technology, to produce a practical product.

A significant problem which must be overcome in any VTOL aircraft is generation of sufficient "lift" to raise the vehicle off the ground.

A second problem is instability. Without the unidirectional airflow that exists across wings and tail surfaces under takeoff conditions in conventional aircraft, directional and stability problems become important. In the present invention gyroscopic effects of the large rotating fan increase stability and reduce said problems to a level well within the scope of pilot control.

Generation of a portion of the required lift is based on Bernoulli's Theorem which states that the energy of a fluid (such as air) is present in three separate energy forms; potential, pressure, and velocity, any one of which may be converted into any other.

In an airfoil section, the shape of said airfoil forces air flowing over the top to take a longer path than that of air flowing below said airfoil so that the air is forced to speed up, increasing its velocity energy. Since under these conditions, potential energy is relatively unaffected, the energy increase due to increase in speed is matched by a pressure decrease in said air.

Aircraft generally utilize this principle by incorporating an airfoil structure or "wing" which will produce this lowered air pressure on its upper surface when moved through the air. Air flowing under said wing is more or less unaffected, so that said average pressure decrease above said wing multiplied by the area of said wing appears as a net lifting force.

A second form of lift is generated by acceleration of a mass of air by a fan, propeller, wing, or other system. When a mass of air is changed from rest to a given velocity in a downward direction, an upwardly directed reaction force proportional to the mass times the velocity change, is produced. The more vertically the air is directed, the more effective this force becomes in producing lift.

A third means of producing lift when close to the ground, effective in takeoff and landing, is "Ground Effect." This is roughly equivalent to creating a zone of very slight compression in the air between the vehicle and the ground and using that pressure times the bottom area of the vehicle to help support said vehicle. This effect becomes stronger as the ground is approached and becomes negligible as the vehicle lifts away from the ground.

The present invention comprises a rational assembly of appropriate technology combined with integrated control systems to produce a practical aircraft. It is an object of the invention to provide a VTOL aircraft which is low in maintenance and relatively safe and simple to operate. It is an object of the invention to provide a VTOL aircraft that has performance characteristics similar to helicopters but without the shortcomings of a helicopter.

SHORT DESCRIPTION OF THE DRAWINGS

FIGS. 7A and 7B show control resistor elements suitable for use with the positioning control of FIG. 7, indicated there by 51 and 59.

SUMMARY OF THE INVENTION

The present invention comprises a compilation of developments in the art of heavier-than-air flight, including principles of lift generation, power sources, construction materials and controls. A foremost design objective is to integrate said factors, along with relative intangibles such as safety and ease-of-operation in order to produce a practical VTOL aircraft without the serious problems characteristic of helicopters. A totally enclosed ducted fan discharging air into pilot-controlled redirecting vanes for essentially radial outflow may eliminate those problems imposed by rotor blades and torque reaction.

Generation of lift includes the principal of Bernoulli, both on the circular wing airfoils and upon the entire upper surface of the airframe due to the flow of induced air while hovering and to both induced airflow and forward speed when under propulsion. Some lift also results from acceleration of air mass in a downward direction through the air handling system and through the generation of "ground effect" when close to the surface. It is believed that most of the lift will come from the wing airfoils. Pilot control of the relatively large number of aircraft control elements is made practical through the use of devices integrating many power driven elements to one control motion. This concept includes the automatic deployment of secondary control elements as primary control elements approach their limits of travel.

The present invention includes utilization of a propjet engine primarily selected for its maximized power-to-weight ratio, but which also produces benefits in other areas; added lift created by intake through fan inlet duct, added propulsion resulting from rearward exhaust and by deflecting exhaust downward for hovering, taking off and landing, a partial cancellation of the low pressure effect created by radial outflow of fan air.

Other aspects of this invention include the use of state-of-the art materials such as honeycomb sandwich panels and glass or boron fiber skins with rigid foam cores in the construction of airframe and wing segments. Close attention to weight control in remaining components of the aircraft lead to a reduction in power and overall size requirements for any given payload.

DETAILED DESCRIPTION OF THE DRAWINGS

Figure 1:
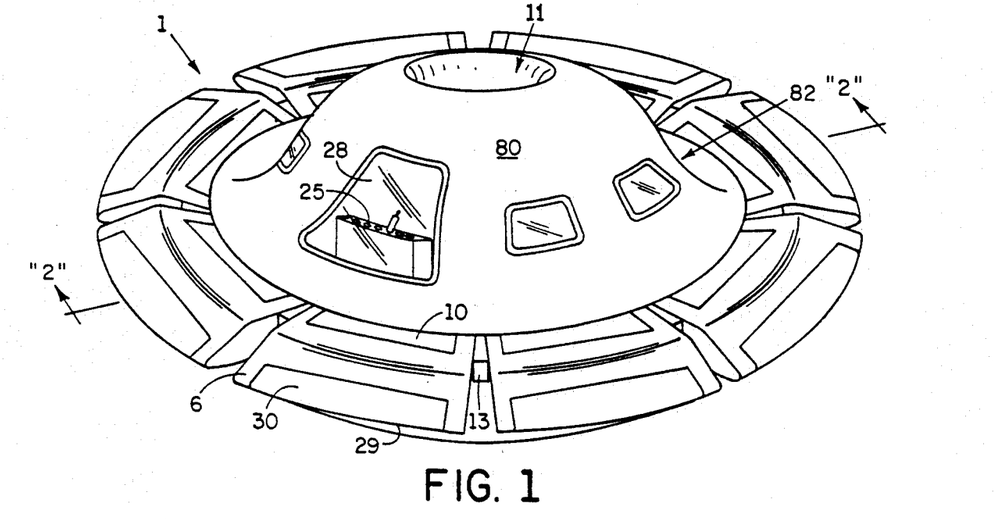
FIG. 1 is a perspective view of the present invention well above the ground in level flight.

FIG. 1 shows the aircraft of the present invention, generally designated by 1, in level flight well above the ground. "Lift" for flight is generated on the airframe from airflow resulting from forward motion and from airflow induced over the upper surfaces by air being drawn into fan inlet 11 and expelled over the perimeter airfoils 6. The lift resulting from forward motion is most effective toward the front of the aircraft, while the fan induced airflow is most effective on rear areas since the greater part of total fan outflow is expelled toward the rear, increasing induced airflow over said areas. An additional lift component, produced by the lowered pressure resulting from air ingestion by fan 3 (See FIG. 2), acts directly over said fan inlet in the center of the aircraft. Lift produced by fan discharge air over circular wing segments 6 may be more effective toward the rear during forward flight, which may result in unbalanced lift tending to raise the rear of the aircraft. This factor is easily controlled, however, as the pilot has command of the "attack angle" of all airfoil segments 6 and can thereby maintain desired aircraft attitude through modification of lift forces all around the aircraft and through conventional "elevator effect" produced by controlled deflection of the airstream at each wing segment 6.

FIG. 1 includes the indication of a vertical plane (A—A) which is $22\frac{1}{2}°$ off the fore and aft centerline of the aircraft and thus perpendicular to airfoil sections 6 which it bisects (in this eight-airfoil representation of the invention.)

Forward propulsion is produced by thrust derived from rearward exhaust of propjet engine 7 and from predominantly rearward exhaust of air from fan 3.

Figure 2:
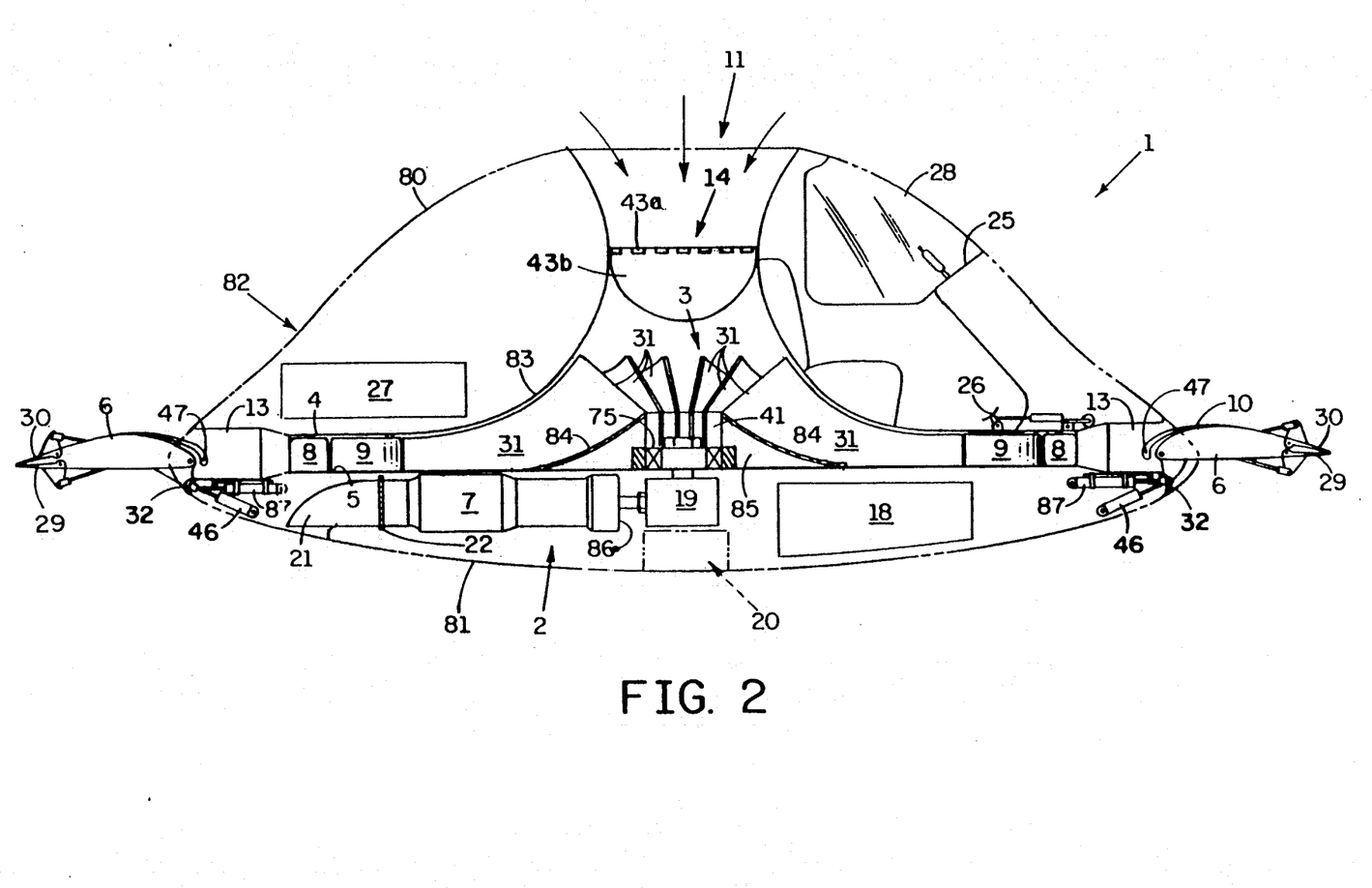
FIG. 2 is a cross sectioned side view of plane "A—A" of FIG. 1.

FIG. 2 is a cross section view of aircraft 1 from plane "A—A", comprising an airframe upper surface formed by a relatively high domed section 80 of generally radial symmetry with a lower section 82 incorporating a reflex curvature toward the horizontal. A hole defining an air passage (fan inlet duct 11) existing in the upper center of said dome, and said fan inlet 11 connected to the outer perimeter of section 80-82 by fan duct structural element 83 incorporating said element's lower extension plate 4.

Figure 2A:
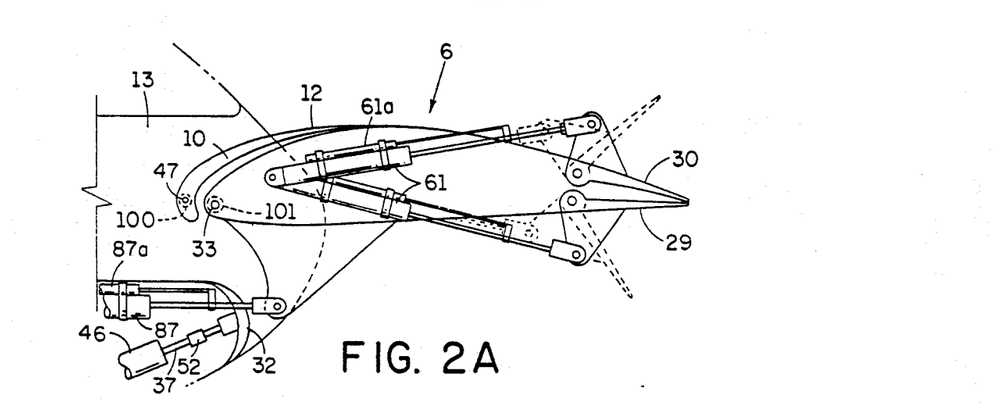
FIG. 2A is a detail of the control cylinders, flaps, spoiler, linkages and air diverting device located in the area of airfoils 6 and set for level flight.
Figure 3:
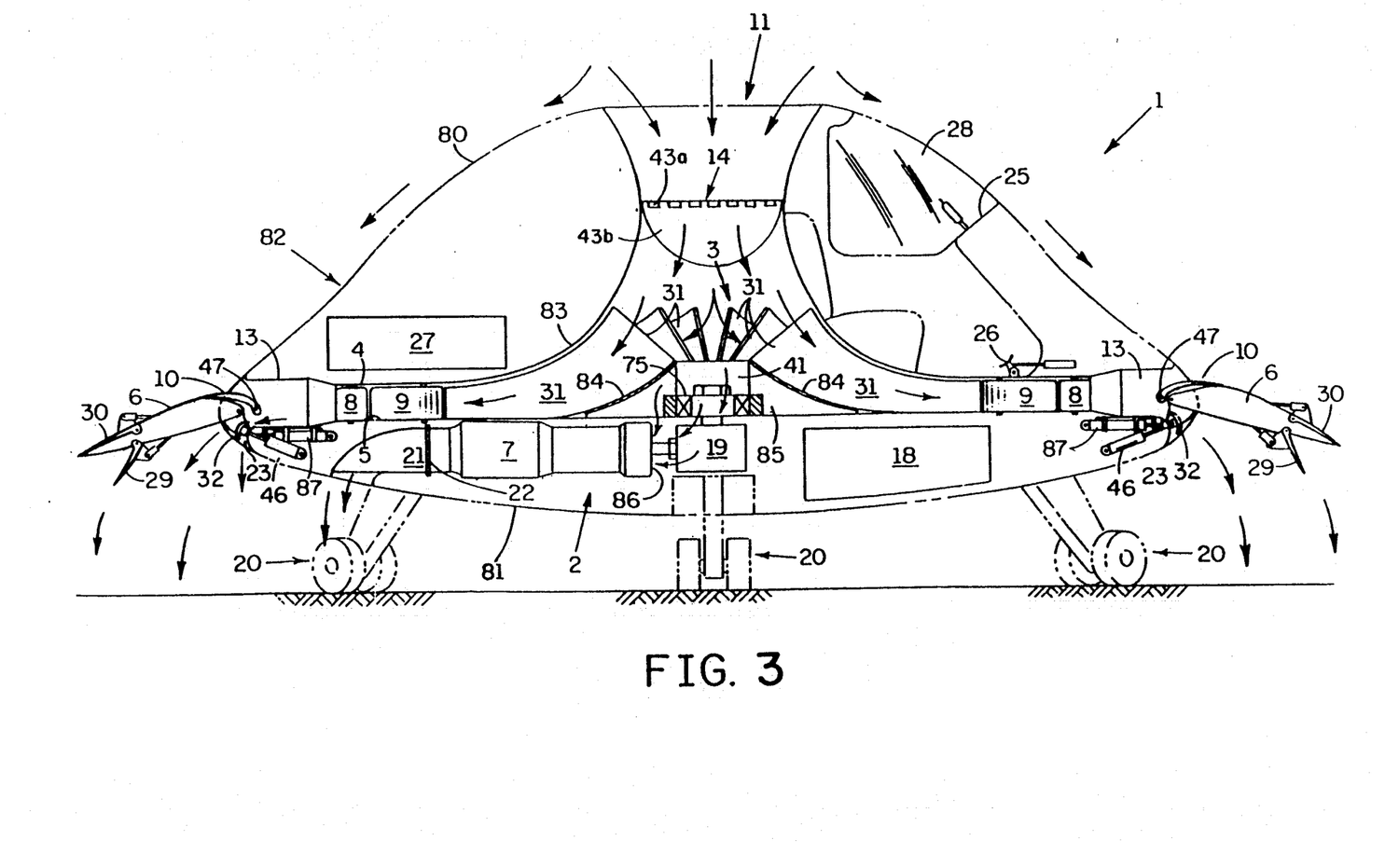
FIG. 3 is a side sectioned view of Plane "A—A" with airfoils, flaps, spoilers and engine exhaust deflector set for takeoff or landing.

Aircraft 1 also includes a lower surface of relatively low domed relief 81 connected at its outer perimeter to a generally flat floor plate 5 which defines the lower surface of the internal fan duct of aircraft 1 as well as the upper surface of the lower airframe section 2 housing engine 7, fuel tank 18, gearbox 19 and landing gear 20 (See FIG. 3). Upper and lower airframe sections are spaced apart and held in a rigid relationship by structural pillars 13 which also act to divide and contain airstreams directed outward over airfoils 6. Said pillars 13 further contain pivot bearings 101 (See FIG. 2A) for shafts 33 of airfoils 6 and contain anchor locations 47 for spoilers 10, as well as hydraulic lines for actuation of airfoil flaps 29 and 30 (not shown). Propjet engine 7 supplies power to right angle drive gearbox 19 to rotate fan 3 within the air duct formed between duct elements 83 with its lower extension 4 and duct floorplate 5. The lower curved structural floorplate 84 of fan 3 defines the remaining sector of the fan duct inboard of floorplate 5 and opposite duct element 83.

Fan 3, comprising hub structure 85, structural floorplate 84 and a multiplicity of curved fan blades 31 may be mounted to the output shaft of gearbox 19 through one-way clutch 75, enabling engine 7 to drive fan 3 in its designated direction of rotation 40 (See FIG. 4A) while allowing it to rotate free of drag from either engine 7 or gearbox 19 in the event of loss of power or other drivetrain malfunction.

Hub structure 85 is an open spoke type to allow free entry of air passing through open center 41 of fan 3, thence through said hub 85 into the lower airframe section of aircraft 1 and thence into air intake 86 of engine 7.

Rotation of fan 3 utilizes the mass of air (rotating with the fan because it is trapped between blades 31) to throw said air outward due to centrifugal force developed therein. Air thus discharged passes by redirecting vanes 9 and volume control vanes 8 before being passed over and under wing segments 6. Air thus discharged is replenished by a flow into fan inlet 11 due to the pressure reduction created in said inlet by action of said fan.

In a unit of modest size such as that illustrated in FIG. 2, a fan diameter of approximately 9 ft., rotating at 625 RPM would discharge air at a velocity of approximately 200 miles per hour. This velocity is sufficient to produce desired effects of lift, propulsion and control. Split clamshell type exhaust deflectors 21 open on hinges 22 to allow exhaust to exit directly rearward or close to deflect said exhaust generally downward. Exhaust deflection may be applied gradually or rapidly and may be given any setting between fully open and closed. FIG. 2 also indicates generally locations for fuel tank 18, hydraulic components 27 (valves, pumps, tanks, etc.), landing gears 20, control panel 25, windscreen 28, rudder pedals 26 and other non-critical items which are peripherally involved with the invention. Components more central to the invention are detailed with reference to their individual drawings. Additional power sources such as a plurality of ram jets placed around the perimeter of the fan are also contemplated.

FIG. 2 shows airfoil sections 6 approximately as they would appear in level flight. Fan discharge is approximately horizontal, elevator flaps 29 and 30 and spoiler 10 are in normal (closed) position. Vanes 43A and 43B located in fan inlet 11 are fully open. Split clamshell exhaust deflectors 21 are shown closed, deflecting exhaust downward which suggests that aircraft 1 is moving slowly or hovering and is using the increased lift resulting from said exhaust deflection.

FIG. 3 shows aircraft 1 in a landing (or take-off) configuration. Airfoils 6 are depressed and spoilers 10 are extended to achieve maximum lifting effort.

Air flow diverters 32 (detailed in FIGS. 2A and 2B) are shown in extended position. Said diverters 32 are located around the outer perimeter of lower aircraft body section 2 and are spaced to more or less fill the gaps between airfoil control cylinders 87. As said cylinders 87 are attached midway along the length of airfoils 6, said airflow diverters extend across the hinge area between said airfoils 6 and approximately halfway along the length of each of the said airfoils 6 mounted to the pillar 13 in the hinge area. In consequence, the number of diverters 32 matches the number of airfoils 6, eight each in this embodiment. Said diverts 32 form a smooth aerodynamic portion of the aircraft's lower body unit 2 and are supported on a plurality of parallel shafts 37 slidably mounted in bearings 52 of body unit 2.

Figure 2B:
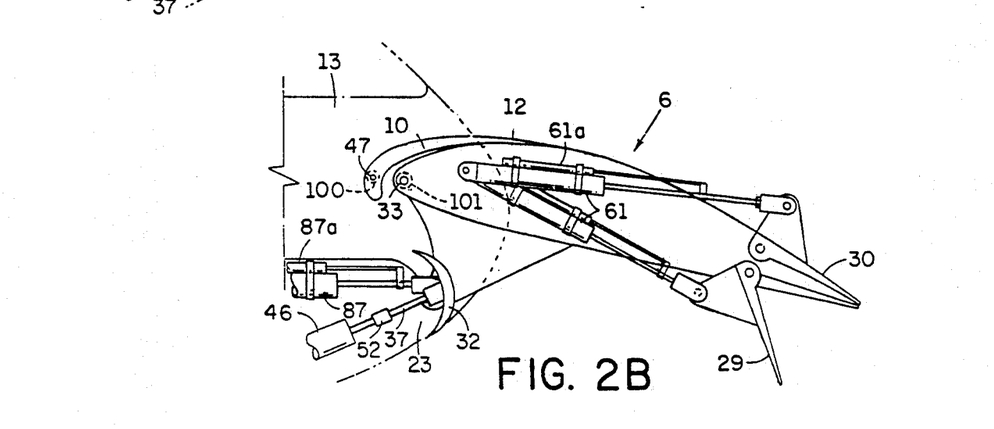
FIG. 2B shows the same details as in 2A but with settings changed to give maximum lift and divert a portion of the fan discharge into the area beneath the aircraft.

Diverter 32 is held against body unit 2 or extended out to the position shown in FIG. 2B and/or intermediate positions by hydraulic cylinder 46, under pilot control. The shaft of cylinder 46 also passes through a bearing 52 and forms one of the several shafts 37 which guide and position diverter 32.

When diverter 32 is extended, air channel 23 is formed. The position of diverter 32, now partially blocking the airflow area below airfoils 6 causes a portion of the air passing therethrough to be redirected through the diversion slot 23 and to be discharged directly beneath the aircraft where it combines with engine 7 exhaust flow to counter the tendency of radial outflow of air from fan 3 to reduce air pressure below the aircraft when close to the ground. This condition must be maintained for several feet above the ground because low pressure zones result if air from below is entrained into a more or less horizontal flow outward over the circular wing when this air cannot be readily supplied from below due to close proximity to a surface.

Automatic deployment of spoiler 10 is illustrated in FIG. 3. Locating pin 47 of spoiler 10 fits into cavity 100 in pillar 13. When spoiler 6 pivots down about shaft 33 contained in shaft anchor 101, the front surface of spoiler 10 stays in its center-of-the-duct location by extending along the upper surface of airfoil 6. The upper extension 12 of spoiler 10 tapers to a narrow edge and blends into the upper surface of airfoil 6. Close contact between said spoiler extension 12 and the top surface of spoiler 6 may be maintained by longitudinal dovetail slots in airfoil 6 matching dovetail studs on the spoiler extension 12 or similar means.

Figure 6:
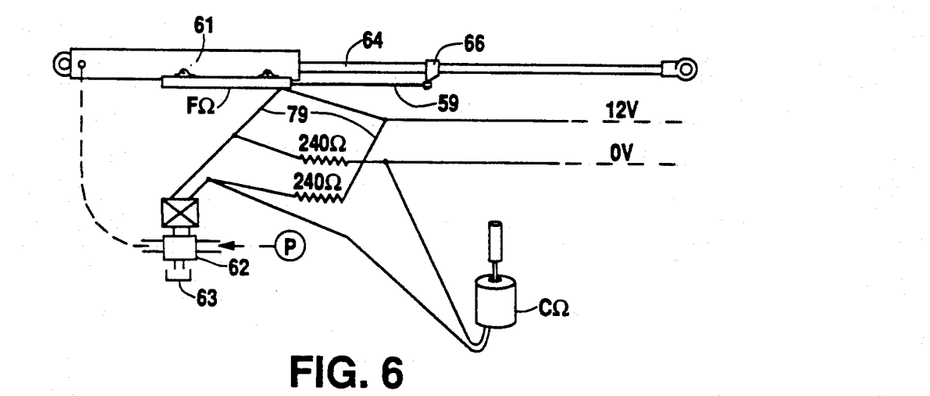
FIG. 6 illustrates one method for hydraulic power positioning of control elements suitable for this application.

Flaps 29 and 30 are extended by cylinders 61 and 61a controlled by the pilot through the use of electrohydraulic proportioning means linking manual devices to positioning of aircraft control elements as detailed in FIG. 6.

Figure 4A:
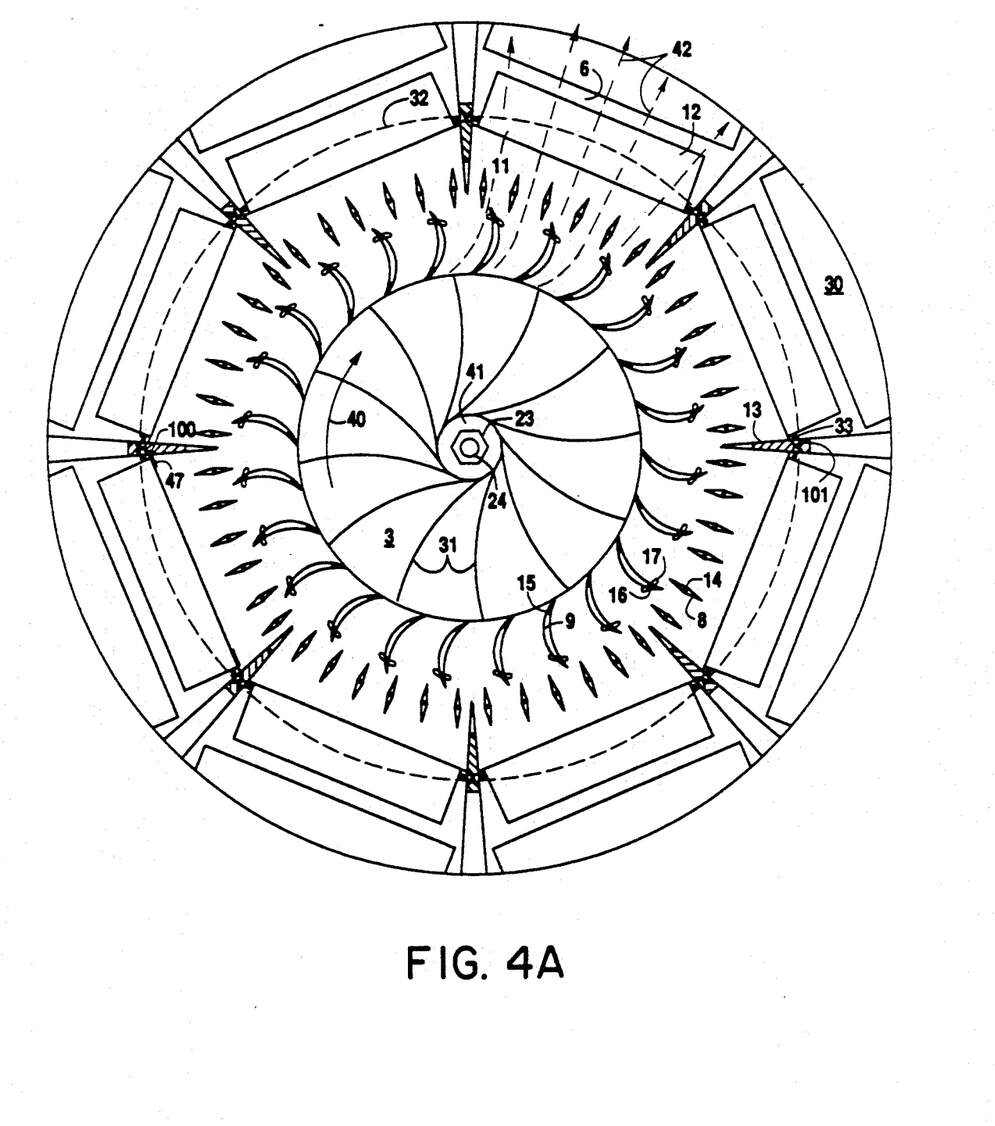
FIG. 4A is a top view of the ducted fan air handling system showing uniform air flow over all airfoils.

FIG. 4A shows a top view of the air handling system of the present invention. Fan 3, driven by the output shaft 24 of gearbox 19 rotates in the direction shown by arrow 40. Air entering from above the center areas of fan 3 is centrifugally discharged and leaves the fan more or less tangentally as indicated by airflow lines 42. Said discharge air is deflected radially outward by redirecting vanes 9 so as to pass more or less radially outward across airfoil sections 6. Said redirecting vanes are adjusted by the pilot to control the vehicle's radial orientation; a shift of airflow slightly clockwise of radial will cause a reaction turning the aircraft counter-clockwise and vice-versa.

Air flowing past redirecting vanes 9 and cutoff vanes 8 enters a zone between pillars 13 and thence flows out above and below airfoils 6, resulting in lift and/or drag effects under the control of the pilot through his ability to adjust airfoil attack angles and extend flaps 29 and/or 30 as desired.

Figure 4B:
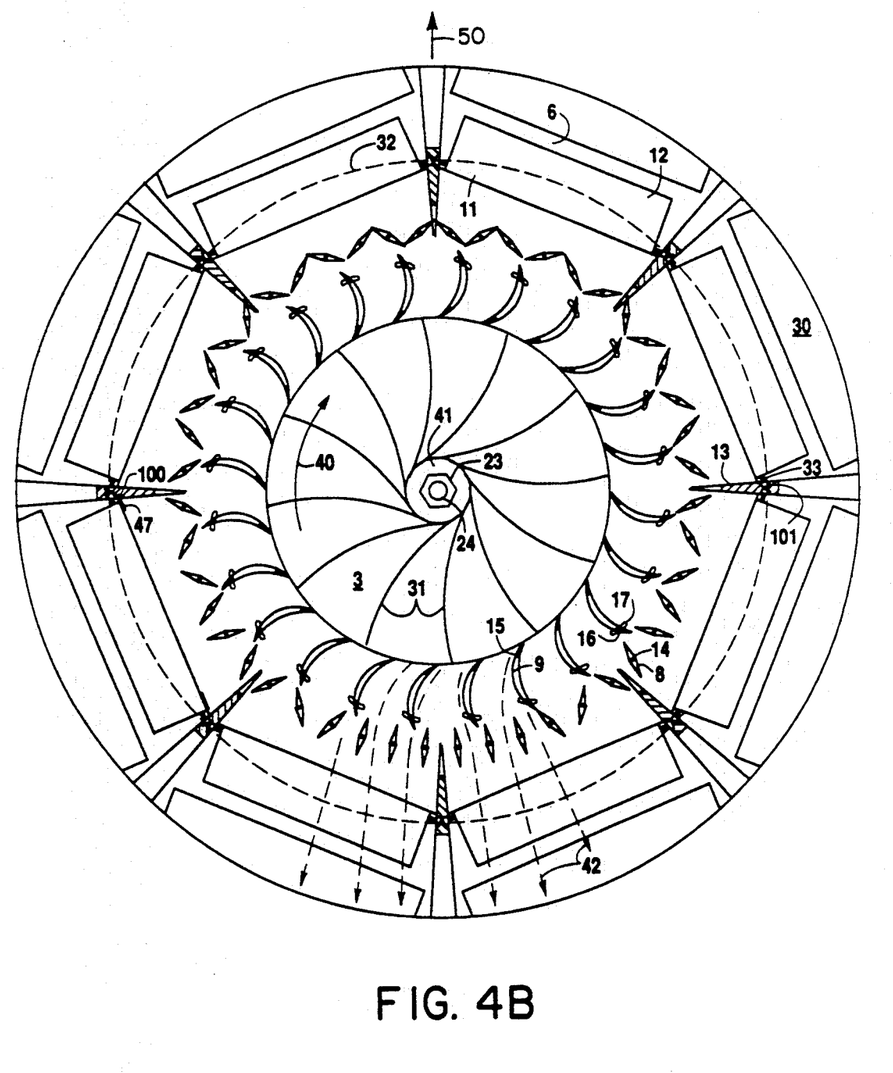
FIG. 4B is a top view of said air handling system showing the air cutoff and air redirecting vanes set for forward propulsion.

FIG. 4B shows vanes 8 adjusted for near maximum propulsive reaction in the direction of arrow 50, as forward vanes 8 are fully cut off and rearward vanes 8 are fully open. Intermediate vanes are partially open to either add propulsive effect (for those sectors rearward of the aircraft's transverse centerline) and/or to provide lift necessary for flight and stabilization.

The rotation of Fan 3 not only produces a flow of air over the circular wing but it also acts as a large gyroscope. This gyroscopic action makes the craft very stable and able to counter outside forces caused by wind currents in the atmosphere. Precession of the gyroscope is corrected by the craft operator by means of coordinated movement of the moveable sections of the circular wing in order to maintain a level attitude of the craft.

In the event of an engine malfunction the craft will begin to descend and reach a very low terminal velocity because of the circular design of the craft. This gives it a parachute drag effect and the craft is maintained in a horizontal attitude (e.g., the descent of a frisbee) by the gyroscopic action of the relatively heavy fan. To maintain fan RPM in the event of power fialure, fan inlet air may be closed off by vanes 43A and 43B, reducing fan drag and allowing Fan 3 to freewheel by disengagement from the engine. This condition would remain until the craft descends to a pre-determined altitude above the ground. At this point the air intake vanes 43a and 43b would be opened, thus giving the circular wing lift and the aircraft controllability for a relatively soft touch down.

Figures 8, 8A, 10:
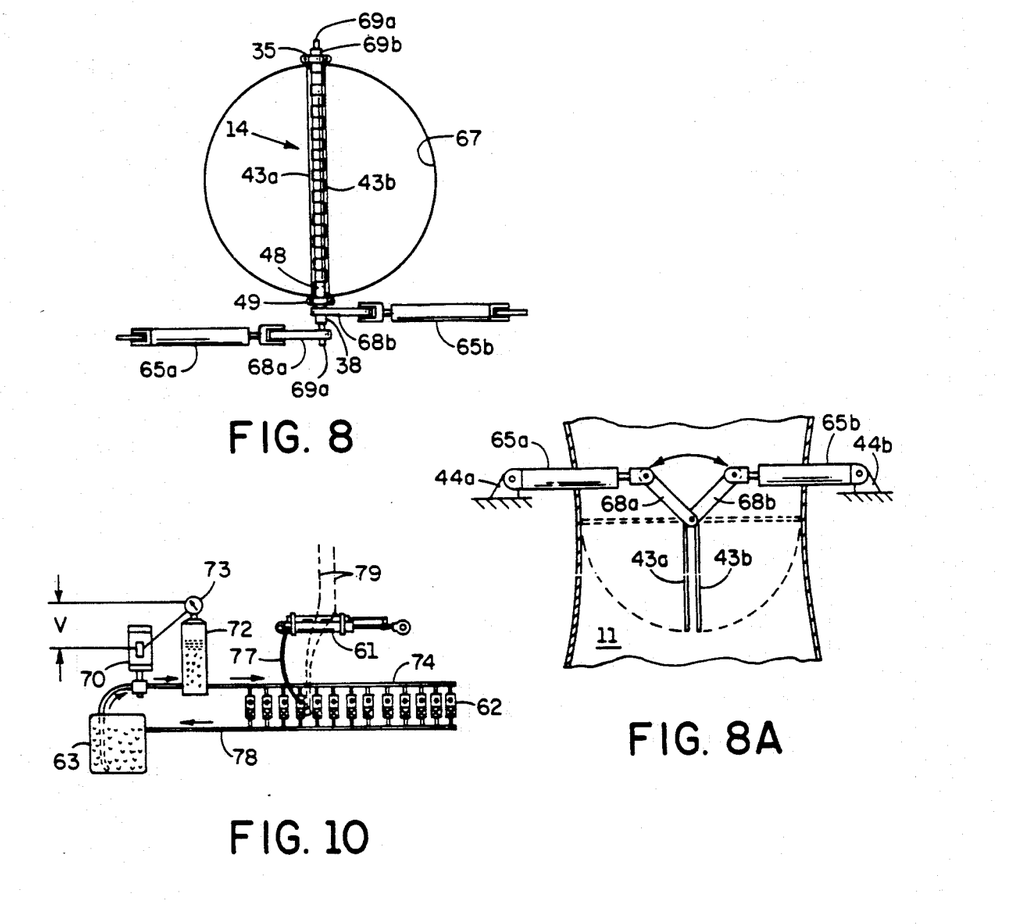
FIG. 8 shows a top view of the components and the control linkage for the intake air duct cut-off system.
FIG. 8A is a side view of FIG. 8 showing how vanes 43A and 43B move to close off the air inlet duct.
FIG. 10 shows a suitable hydraulic arrangement for the independent hydraulic control of a large number of elements from one hydraulic source.

FIGS. 8 and 8A show the inlet duct cut-off system including its actuating linkage. Vanes 43a and 43b are hinged along a centerline over shaft 69a which entends through the entire hinge area 14 and is supported by bearing 50 and indirectly by bearing 49. (Bearing 49 holds hinge tab 38 of vane 43b and shaft 69a rides concentrically within tab 48.) A lever 68a is fastened to shaft 69a in the angular relationship shown, such that a thrust from cylinder 65a will rotate vane 43a from its position shown in solid lines to the position shown in dotted lines in FIG. 8A. Cylinder 65a is mounted to the aircraft frame through lug 44a.

The opposite side of the hinge, vane 43b, is similar to the arrangement shown for vane 43a except that vane 43b is slideably mounted over shaft 69a and may rotate independently. The rotation of vane 43b is controlled by the lever 68b mounted to the extended hinge tab 48 and actuated by cylinder 65b anchored to lug 44b.

When cylinders 65a and 65b are extended, said vanes 43a and 43b form a circular plug with a circular outside diameter 67 which may tightly close the circular inlet duct 11. Retraction of said cylinders leaves said duct fully open except for a narrow strip occupied by hinge 14 of vanes 43a and 43b. The vanes themselves may lie entirely within the vertical space below said hinge.

As said vanes are never set in an intermediate mode, they may be controlled by cylinders lacking proportioning characteristics.

Hydraulic valves are available which respond to a D.C. voltage signal. For example, a DANFOSS PVG 32 hydraulic valve may be inactive at an impressed voltage of 6 volts D.C., while directing flow for cylinder extension at voltages above 6 v, and retraction below 6 v. Said electro-hydraulic valves do not power themselves directly from control voltage signals, but use said signals to operate commercially available electronic amplifiers to supply power for the actual shifting of said hydraulic valves. For clarity, and because there is no substantive difference in the operation, this intermediate stage will be ignored in subsequent descriptions.

Figure 5A:
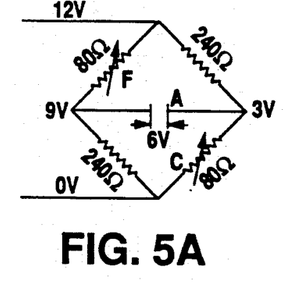
FIGS. 5A, 5B, and 5C show a "wheatstone-bridge" arrangement of fixed and variable resistors across a base voltage from which control signals and positive control element positioning are derived.
Figure 5B:
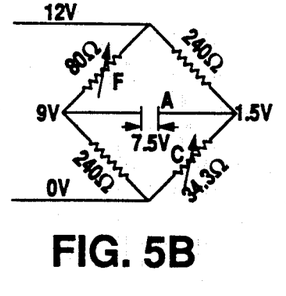
Figure 5C:
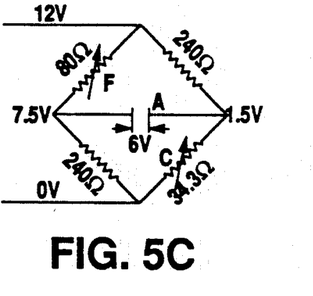

Reference to FIGS. 5A, 5B, and 5C will illustrate the means by which control voltage is provided for the operation of hydraulic devices positioning aircraft control elements.

FIG. 5A shows a classic Wheatstone Bridge placed across a 12 volt D.C. power supply. This "Bridge" comprises two fixed resistors and two variable resistors. With resistance valves as shown, and since all current through 80 OHM variable/resistor F must also pass through the 240 OHM fixed resistor in the same conductor path $(80/(80+240) \times 12 \text{ v})$ 3 volts will be "dropped" through 80 OHM variable resistor F, so that 9 volts appear on the left side of control voltage A. At the same time the current in the right side of the bridge passes through the 240 OHM fixed resistor before passing through the 80 OHM variable resistor so that $(240/(240+80) \times 12 \text{ v})$ 9 volts will be "dropped" through the 240 OHM fixed resistor and 3 volts appear on the right side of control voltage A. Control voltage is now (9 v−3 V) 6 volts.

FIG. 5B shows the same "bridge" with variable resistor C reduced to 34.3 OHMS. The left side of the bridge is unchanged so that 9 volts still appears there. On the right side, where the ratio of fixed to variable resistance was 3 to 1 in FIG. 5A, it is now 7 to 1. Once again, current through both resistors must be the same since they constitute the only electrial pathway, hence a voltage drop ratio of 7 to 1 will result. $(12 \times \frac{7}{8})$ 10½ volts are now dropped through the 240 OHM fixed resistor, therefore 1½ volts appears on the right side of A. Control voltage is now (9 v−1½ v) 7½ volts.

Balance (6 v. control voltage) can be reachieved in the "bridge" arrangement of FIG. 5C if all other factors are held constant only by increasing variable resistor F in order to "drop" more voltage through it until the left side voltage is reduced to 7½ volts, (7½ v.−1½ v.=6 v.) This point exists at F=144 OHMS. $144/(240+144) \times 12$ v=4½ volts drop through variable resistor F. 12 v−4½ v=7½ volts on the left side of control voltage A, minus 1½ volts (unchanged) on the right side, re-establishes the "neutral" or inactive control voltage (6 v.).

FIG. 6 shows an arrangement of variable and fixed resistors which will link a specific resistance of an element C to a specific position of an aircraft control element F remotely operated by hydraulic means in response to said resistance of element C.

61 is a hydraulically extended, spring returned cylinder which has a variable (feedback) resistor F attached thereto with shaft 64 of cylinder 61 and shaft 59 of resistor F aligned in parallel relationship. Attachment 66 ties motions of said shafts together so that any given extension of shaft 64 will correspond to a specific resistance value of variable resistor F.

Figure 7:
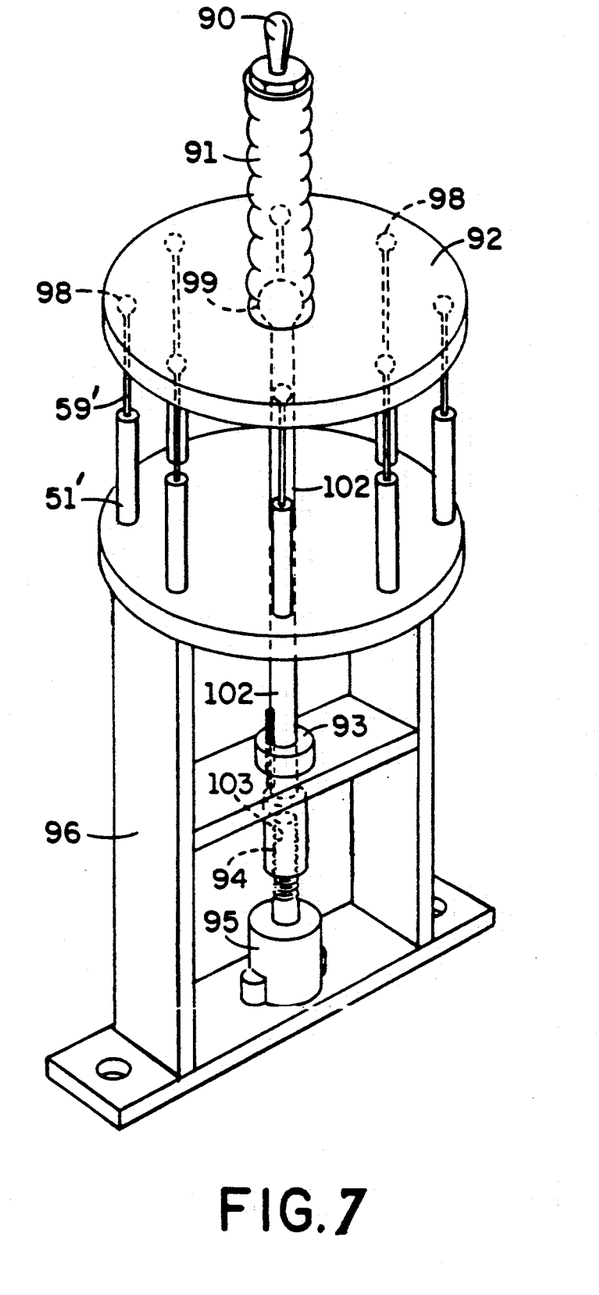
FIG. 7 shows the airfoil positioning control illustrating the means by which it coordinates the positioning of a number of elements.
Figure 7A:
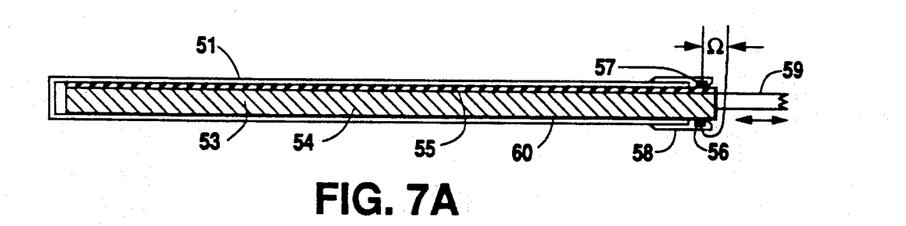
FIG. 7A shows a feedback resistor element suitable for use with the control unit of FIG. 7. This resistor element would be mounted on the driven cylinder.
Figure 7B:
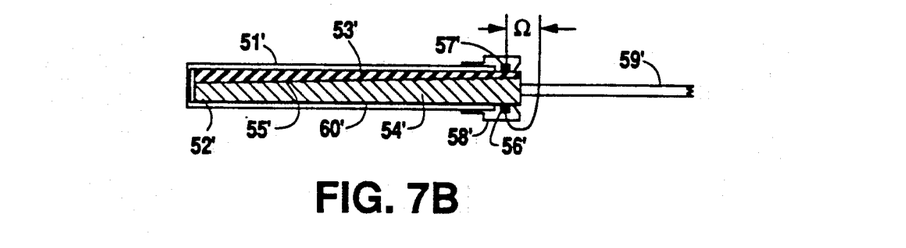

FIG. 7A and 7B show a design for variable resistors suitable for use in this control system. FIG. 7A is a relatively long variable resistor suitable for use as resistor F mounted on hydraulic cylinder 61. 51 is an electrically insulated case surrounding the resistive plunger 53 which is square or rectangular in cross section to prevent rotation in case 51. Said plunger 53 comprises a structural insulator core 54 with a conductive strip 60 along the length of one side and across one end near the attachment of control shaft 59.

Resistive material 55 is bonded to conductive strip 60 at said shaft end and lies along the side opposite said conductive strip for the length of the plunger 53.

Said resistive material may be tapered as shown in FIG. 7A in order to increase its resistance in a non-linear fashion. The unit illustrated will increase resistance at a rate greater than linear as it is withdrawn, as current must pass through material which decreases in cross section as plunger 53 moves outwardly.

Electrical contacts are designated 56 for the "line" contact and 57 for the resistive element contact. Both are held in insulated head 58, bonded or fastened to case 51. In this arrangement, control wiring is fixed in place and does not move as adjustments in resistance values occur.

FIG. 7B is similar to FIG. 7A except that the unit is illustrated in a shorter configuration and the conductive strip 60' is bonded to the resistive material 55 at the base of the plunger, resulting in a unit that decreases in resistance as plunger 53' is withdrawn, with that decrease occurring at a greater-than-linear rate.

It is obvious from these examples that variable resistors can be fitted to requirements of control conditions by manipulation of the shape, resistivity, length and attachment conditions of resistive materials therein.

In FIG. 6 electro-hydraulic valve 62 is a three-way valve which connects with the hydraulic supply P through one port, cylinder 61 through a second port and a third port returns oil to hydraulic tank 63.

Valve 62 is electrically actuated, existing in one state of internal porting at signal voltages above a set value, a second state at or very near said voltage, and a third internal porting state at signal voltages below said voltage.

In FIG. 6 the valve 62 passes hydraulic pressure to cylinder 61 to extend rod 64 when the signal voltage is below said valve's neutral setting (assume 6 volts "neutral").

At or very near said neutral signal value, valve 62 blocks pressure from P and the return flow from cylinder 61 so that the aircraft control device activated by said cylinder is maintained in position.

When signal voltage is above said neutral signal value, pressure from the hydraulic supply P remains blocked but return oil flow from cylinder 61 to tank 63 is opened. Thereby, the internal spring contained between piston and head-gland of cylinder 61 retracts said cylinder. Cylinders are also available which are spring-extend, hydraulic return. The type used depends chiefly on which motion requires the greater force. Said greatest force motion is commonly supplied by the hydraulic pressure phase. Yet another option is to use 4-way valves with the same type of control. This option yields hydraulic force both for "extend" and "retract" motions but carries the penalty of larger and heavier valves and extra valve-to-cylinder hoses.

With an understanding of the operating characteristics of the components of the system. We can now describe the functioning of the control configuration of FIG. 6.

Assume cylinder 61 is shown at the center of its stroke with resistor F (feedback) at 80 OHMS and resistor C (manual control) at 80 OHMS. This results in a signal voltage of 6 v (FIG. 5A) and therefore cylinder 61 is blocked and the controlled aircraft component is held in position.

The pilot moves the handle of the control element to reposition the plunger of variable resistor C to a point yielding a new resistance of 34.3 OHMS. This results in the "bridge" conditions of FIG. 5B and a voltage signal greater than 6 volts; therefore the valve 62 will shift to a new condition. Assume the valve shifts to admit oil from P into cylinder 61. This will extend shaft 64 and its attached shaft 59 of resistor F (FIG. 7A) extending the shaft of resistor F increases the resistive value of said resistor and thereby reduces the control voltage across the valve 62 until a neutral point of 6 v. is reachieved. This takes place at a value of 144 OHMS in the "feedback" resistor F (FIG. 5C), corresponding to a specific extension distance. All intermediate values of control resistor C correspond to specific intermediate values of feedback resistor F and thereby to a specific extension distance. The foregoing sequence works equally and oppositely should the control resistor be increased in value rather than decreased as it was in this example.

With the foregoing example understood, the control of a multiplicity of control resistors (and aircraft control elements driven by systems similar to that of FIG. 6) may be illustrated with reference to FIG. 7.

In the manual control device of FIG. 7 control handle 91 is fitted with a self-centering 3-position momentary toggle switch 90 which the pilot may deflect right or left with the thumb of the hand holding said handle. At the base of said handle and integral with it is wobble plate 92 pivotally supported at its center on ball joint 99. Depending from said wobble plate are a multiplicity of resistor element control shafts 59', uniformly spaced in both radial angle and distance from the center of ball joint 99. Said control shafts connect to wobble plate 92 through ball joints 98. Thus, when the handle is moved, forcing any shaft to extend or retract, its opposite element will move equally and oppositely and intermediate elements will also extend or retract proportionally, provided that the bodies 51' of the resistor units are maintained in their original positions. This is accomplished in the control unit of FIG. 7 by attaching the body 51' of said variable resistor units to frame 96 of said control.

Slide connection 93 is formed between shaft 102 and frame 96 and may be either square, keyed, or otherwise constructed to allow linear motion without rotation. Said linear motion results from the rotation of threaded shaft 94 within the threaded interior 103 of shaft 102, powered by low speed gearmotor 95 also mounted to frame 96 and controlled by thumb switch 90 of handle 91.

An example of the manner in which the control assembly of FIG. 7 may be linked to the attack angles of several airfoils 6 will be described in order to illustrate basic principles employed in the control of aircraft 1.

In order to counteract pitch or roll of aircraft 1 away from the horizontal, a movement of handle 91 in the direction of the correcting motion desired will cause greatest extension of control resistors C on the side directly opposite the direction of motion of handle 91 and maximum depression in those resistors C toward which the motion is directed. All intermediate resistors C will react in proportion to their angular relation to the axis of said motion. If each resistor C of said manual control is spaced to coincide radially with the elevator which it controls (taking into consideration the laws of gyroscopic precession) and if the control relationships of signal voltage and hydraulic action are correctly linked, a motion of handle 91 will depress elevators at a proper angular offset from the direction of motion required and raise those on the opposite side thereby tilting aircraft 1 in the direction of said handle motion. If the pilot desires to reduce lift, he is able to raise all elevators at once by depressing all resistor C units together. This is accomplished by thumb switch 90 lowering the wobble-plate 92 with respect to the resistor bodies 51 mounted on frame 96. Gearmotor 95 controlled by thumb switch 90 turns threaded shaft 94 to lower or raise shaft 102 through slip-joint 93 to achieve this control effect. Raising said wobble plate increases lift by lowering elevators together.

The effect just described does not proscribe the previous effect of "tilting" the control handle to reapportion lifting forces around the aircraft, it superimposes a new "neutral" position, either above or below the previous airfoil attack angle. Should any controlled aircraft element reach its limit of travel before said motion can restore electrical balance in the system, said controlled element "stalls" against said limit until the pilot's control calls for a new setting within said controlled element's range of action. This allows vanes to close against stops under pressure, insuring tight seals, and further allows voltages to be impressed directly (as by emergency push-buttons) for maximum speed reactions bypassing lowered proportional flow rates as "feedback" resistors begin to restore control voltage balance.

Utilization of the wobble-plate principal for proportioning relative motion of airfoils 6 around aircraft 1 and control of the "average attack angle" of all airfoils 6 considered together, gives a pilot control of aircraft altitude and lift over the range of capabilities of said aircraft through the motions of one hand.

Figure 9:
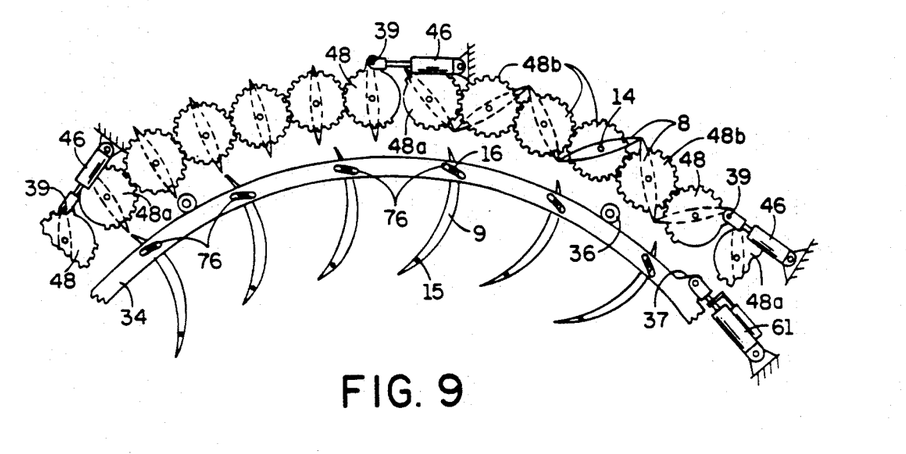
FIG. 9 shows air control vanes for both controlling volume of flow (vanes 8) and directing the flow outward across the airfoils (vanes 9) and their respective control elements.

FIG. 9 shows vanes and control linkages suitable for use in the fan discharge air duct of the present invention. Air passes from the fan first through redirecting vanes 9 and then through volume control vanes 8 (FIG. 4).

Volume control vanes 8 are mounted on shafts 14 which pass through bearing holes in upper duct plate 4 and lower duct plate 5 (not shown in this drawing for clarity), shafts 14 thereby hold said vanes 8 in a circular, uniformly spaced pattern and allow only a rotating action integral with said shafts. Gears 48a, partially stripped gears 48 and 48b are mounted and locked to said shafts 14 to engage each other and to maintain each gear group in a specific rotational relationship as shown in FIG. 9. When any one of the vanes 8 in a specific group is rotated, each alternative vane of that group rotates the same direction and to the same degree. Intermediate vanes also rotate to the same degree but in the opposite direction. Thus the 6-vane group located left-of-center in FIG. 9 having all vanes set for maximum "open" condition (radially outward) will, on full retraction of group cylinder 46, assume the configuration of the group to the right-of-center which has sealed off the duct air passage by touching vane tips. All gears are located outside the air duct on shaft 14 extensions beyond floorplate 5 (which is invisible in this drawing). Any intermediate position may be set and held by the control system previously described. The control illustrated in FIG. 7 is suitable for control of vanes 8, if the number of control resistors and their radial orientation correspond with the areas controlled by each of the several vane 8 groups as iluustrated in FIG. 9. Average opening would be controlled by thomb switch 90. The control for vanes 8 would be set up to provide propulsion in the direction of and in proportion to the degree of control handle "tilt", with average opening regulating the proportion of total airflow diverted from "lift" to produce said propulsion.

FIG. 9 also shows a linkage suitable for control of air redirecting vanes 9. Vanes 9 incorporate shafts 15 through floorplate 5 and upper duct plate 4 and each has an additional shaft lug 16 passing upward through slot 17 (see FIG. 4) in fan duct upper plate 4 to allow vanes 9 a narrow range in which to pivot about shafts 15. Slotted ring 34 fits over said slots 17 and receives shaft lugs through radial slots 76. Ring 34 is confined to rotation without lateral movement by a multiplicity of grooved rollers 36 situated around its outer edge. Air escape through slots 17 is largely prevented by fitting ring 34 closely over said slots and largely filling the intersection of slots 17 and 76 with shaft lug 16. Control of vanes 9 is accomplished by a single cylinder 61" controlled by foot pedals 26 or may be controlled in an alternate embodiment by direct mechanical linkage to said foot pedals as in conventional rudder controls. (Vanes 9 in this aircraft correspond to the action of rudders in conventional designs).

FIG. 10 shows a means by which a multiplicity of devices may be powered and controlled from a single hydraulic source. Oil is drawn from tank 71 by pump-motor unit 70 and is forced into accumulator 72 until gasses trapped in said accumulator's upper chamber compress sufficiently to open pressure switch 73 and stop said pump-motor unit, so that a quantity of hydraulic oil under pressure is available upon demand from valves situated along accumulator outlet manifold 74. These valves 62 block all flow from said manifold except when they direct it to a cylinder through hose 77 to produce motion as called for by the pilot. Flow to any cylinder cannot exceed its barrel cross-section times its stroke, a maximum of a few cubic inches for small control cylinders (indicated at 61)

Cylinder strokes in the spring-return phases of control motions use no hydraulic supply, but return previously supplied oil from the cylinders to hydraulic tank 63 through hose 77, valve 62, and return manifold 78.

When total oil supplied to control cylinders is sufficient to lower pressure in accumulator 72, pump/motor 70 is restarted and runs until accumulator 72 again fills to the upper setting of switch 73 and stops said pump/motor. Control wiring 79 links valves 62, cylinder 61, and the control elements in the hands of the pilot.

Hydraulic oil to power said flap-control cylinders and control wiring to feedback elements of said cylinders passes into airfoils 6 near pivot shafts 33, or may enter through said shafts by making them hollow.

The descriptions given are examples of means which may be used to achieve this invention, and are not to be interpreted as limiting but only as illustrating a coherent plan to produce a practical, economical and safe aircraft.

It will be apparent to those skilled in the art that various modifications and variations can be made in the foregoing method and apparatus of the present invention and in the construction of the foregoing method and apparatus of the present invention without departing from the scope or spirit of the invention. Thus, it is intended that the present invention cover the modifications and variations of this invention, provided they come within the scope of the appended claims and their equivalents.

I claim:

1. A vertical take off and landing aircraft comprising:
   an airframe of generally radial symmetry about a central located ducted fan ingesting air from above said aircraft and discharging said air generally horizontally toward the outer perimeter of said aircraft through a duct defined by an upper and a lower plate extending to the perimeter of the aircraft body;
   a plurality of curved airflow redirecting vanes pivotally mounted within said duct outboard of and adjacent to the discharge of said fan and adjustable for redirection of said fan discharge into essentially radial airflow;
   a plurality of flow-restricting vanes pivotally mounted in said duct outboard of and adjacent to said airflow redirecting vanes;
   a generally circular wing comprised of a plurality of similar airfoil segments pivotally mounted in the air discharge of said duct in such a relationship that said air discharge flows generally evenly above and below the airfoil segments of said wing;
   a control means for operably linking and controlling the relative positioning of said airfoil segments;
   said circular wing airfoil segments are equipped with automatically deployed and retracted spoilers;

said circular wing airfoil segments are equipped with split flap.

2. The aircraft of claim 1, wherein:
the control means includes means to control the positioning of the said airfoil elements by wrist and thumb movements of one hand of an operator.

3. The aircraft of claim 1, wherein:
the ducted fan provides a gyroscopic effect to stabilize the aircraft.

4. The aircraft of claim 1, wherein:
air cutoff vanes are mounted in the fan inlet duct.

5. The aircraft of claim 1, wherein:
engine air enters through the intake of said ducted fan and thence through openings in the floorplate of said ducted fan.

6. The aircraft of claim 5, wherein:
the power is supplied by an engine driving said ducted fan through a gearbox equipped with a one-way clutch at its output stage.

7. The aircraft of claim 6, wherein:
the engine exhaust may be deflected downward during hovering, takeoffs and landings and discharged rearwardly for forward propulsion.

8. The aircraft of claim 1, wherein:
the horizontal heading of said aircraft is controlled by foot pedals linked to said redirecting vanes.

9. The aircraft of claim 1, wherein:
the forward propulsion of said aircraft is controlled by the selective redistribution of discharge air around the perimeter of the aircraft by means of said flow restricting vanes.

10. The aircraft of claim 7, wherein:
said split flaps are controlled to increase drag and thereby to control side to side drive during hovering.

11. The aircraft of claim 1, wherein:
the controls are electro-hydraulic, integrated with position-sensitive feedback sensors linked to the driven elements.

12. The aircraft of claim 1, wherein:
the controls are servo-hydraulic.

13. The aircraft of claim 1, wherein:
power failure protection means provides for free rotation of the fan until needed to provide lift at touchdown.

* * * * *